(12) United States Patent
Bonds

(10) Patent No.: US 11,944,069 B2
(45) Date of Patent: Apr. 2, 2024

(54) TWO HANDED DOG LEASH

(71) Applicant: Stephen Joshua Bonds, Suisun, CA (US)

(72) Inventor: Stephen Joshua Bonds, Suisun, CA (US)

(73) Assignee: Ergo Dog, LLC, Suisun City, CA (US)

( * ) Notice: Subject to any disclaimer, the term of this patent is extended or adjusted under 35 U.S.C. 154(b) by 239 days.

(21) Appl. No.: 17/553,640

(22) Filed: Dec. 16, 2021

(65) Prior Publication Data

US 2022/0104462 A1 Apr. 7, 2022

Related U.S. Application Data

(63) Continuation-in-part of application No. 16/520,329, filed on Jul. 23, 2019, now Pat. No. 11,229,190.

(51) Int. Cl.
*A01K 27/00* (2006.01)

(52) U.S. Cl.
CPC .................. *A01K 27/004* (2013.01)

(58) Field of Classification Search
CPC .... A01K 27/00; A01K 27/004; A01K 27/003; A47D 13/086; A62B 1/14
USPC ....... 119/769, 770, 777, 795, 797, 798, 799, 119/801–808; 188/65.1; 74/526–529
See application file for complete search history.

(56) References Cited

U.S. PATENT DOCUMENTS

| | | | | |
|---|---|---|---|---|
| 2,337,970 A * | 12/1943 | Cassell | ................ | A01K 27/005 |
| | | | | 119/799 |
| 4,391,226 A * | 7/1983 | Guthrie | ................ | A01K 27/005 |
| | | | | 119/797 |
| 4,493,134 A * | 1/1985 | Karr | ........................ | H01R 4/00 |
| | | | | 439/456 |
| 4,562,792 A * | 1/1986 | Pak | ...................... | A01K 27/003 |
| | | | | 119/797 |
| 5,483,926 A * | 1/1996 | Bogdahn | .............. | A01K 27/004 |
| | | | | 119/796 |
| 9,770,012 B2 * | 9/2017 | Chappell | ............... | A01K 27/004 |
| 10,420,326 B1 * | 9/2019 | Rand | .................... | A01K 27/005 |
| 2005/0217610 A1 * | 10/2005 | Thompson | ........... | A01K 27/004 |
| | | | | 119/795 |
| 2011/0277700 A1 * | 11/2011 | Friedland | ............ | E05B 73/0005 |
| | | | | 70/58 |

(Continued)

FOREIGN PATENT DOCUMENTS

| | | | | |
|---|---|---|---|---|
| DE | 202015003650 U1 * | 8/2015 | ........... | A01K 27/003 |
| GB | 2528783 A * | 2/2016 | ........... | A01K 15/025 |
| SE | 1630178 A1 * | 1/2018 | ........... | A01K 27/003 |

*Primary Examiner* — Monica L Perry
*Assistant Examiner* — Brook Victoria Schmid
(74) *Attorney, Agent, or Firm* — Christopher Pilling

(57) ABSTRACT

A two-handed dog leash is provided having a rigid tubular member having a first handle, a second handle, and central portion. The central portion is positioned between the first and second handles and defines a centrally located aperture. A cleat assembly is positioned within the centrally located aperture. A leash terminating member secures a first end of a flexible leash within the central portion. The flexible dog leash having a second end configured to pass through the cleat assembly within the centrally located aperture and the flexible dog leash is capable of extending and retracting through the cleat assembly such that the length between the second end and rigid tubular member is adjustable.

11 Claims, 20 Drawing Sheets

(56) References Cited

U.S. PATENT DOCUMENTS

| | | | |
|---|---|---|---|
| 2014/0263799 A1* | 9/2014 | Baerwald | A01K 27/004 242/381.5 |
| 2015/0315822 A1* | 11/2015 | Garthe | E05B 73/0005 70/15 |
| 2020/0296933 A1* | 9/2020 | Andaloro | A01K 27/006 |

* cited by examiner

TWO HANDED DOG LEASH

CROSS-REFERENCE TO RELATED APPLICATIONS

The present application is a continuation in part, filed on Jul. 23, 2019, the disclosure of which is hereby incorporated in its entirety at least by reference.

BACKGROUND OF THE INVENTION

1. Field of the Invention

This invention relates generally to the field of dog leashes and more specifically to a two-handed dog leash.

2. Description of Related Art

Many people walk their pet dogs on leashes. This is necessary in urban and suburban areas where an unleashed dog may cause harm to another dog or person or may run away from its owner.

Most dog leashes are made of flexible woven material that is either rope-like or is a flat configuration. One end terminates in a wrist or hand strap, the other end terminates in an attachment fixture that attaches the leash to a dog collar or harness.

However, there is a deficiency in the prior technology in that a person sometimes has trouble holding onto a larger dog when it decides to bolt after something. With a normal leash the user only has the use of one hand to restrain the dog. Additionally, by pulling on one hand, the user's body is forced into an unbalanced position which can cause the person to either lose control of the leash or to fall to the ground.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The primary object of the invention is to provide a dog leash that allows a person to use two hands when using a leash while walking or restraining a dog.

Another object of the invention is to provide a two-handed dog leash that allows the user to adjust the length of the leash.

Another object of the invention is to provide a dog leash that can also be used with one hand when so desired.

A further object of the invention is to provide a dog leash that includes a storage area for bags or treats.

Yet another object of the invention is to provide a dog leash that allows the user to roll up the leash on its rigid bar shaped handle for storage or transport.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed two handed dog leash comprising: a rigid tubular member, a tube cover member, a cleat assembly, a flexible dog leash, and a leash termination member, said rigid tubular member having a hollow portion on one end and a slot portion on the opposite end and a centrally located aperture, said cleat assembly mounted on either side of said tube aperture, said cover member mounted over said cleat assembly, said dog leash member inserted at one end into said central tube aperture, said dog leash terminating on the opposite in said leash termination member, and said dog leash capable of extending perpendicular to said rigid handle member for two handed operation or extending parallel to said rigid handle member and residing in said slot portion of said handle member for one handed operation.

In another aspect of the invention an alternative two-handed dog leash is provided, comprising a rigid tubular member having a first handle, a second handle, and central portion, wherein the central portion is positioned between the first and second handles and defines a centrally located aperture; a cleat assembly positioned within the centrally located aperture; a leash terminating member; a flexible dog leash having a first end and a second end, wherein the first end terminating at the leash terminating member and the second end passing through the cleat assembly within the centrally located aperture; and, the flexible dog leash capable of extending and retracting through the cleat assembly such that the length between the second end and rigid tubular member is adjustable.

In one embodiment, the leash terminating member is entirely positioned within the rigid tubular member. In one embodiment, the cleat assembly includes a pair of spring biased inwardly facing cleat members rotatably pinned to the rigid tubular member. In one embodiment, the flexible dog leash is constructed of rope having a circular cross section. In one embodiment, the flexible dog leash includes a cushioned loop surrounding a portion of the flexible dog leash between the cleat assembly and the leash terminating member. In one embodiment, the rigid tubular member includes end caps at each distal end of the first and second handles. In another embodiment, at least one of the end caps includes a loop configured to receive a wrist strap or attachment fixture, such as the attachment fixture on the second end of the flexible leash when the flexible leash is rolled around the rigid tubular member for storage or transport. In one embodiment, the leash terminating member is formed within the central portion. In one embodiment, the leash terminating member includes a curved passageway having an opened end and closed end with a number of spiked prongs throughout the curved passageway, wherein the spiked prongs are configured to retain the first end of the flexible leash. In one embodiment, the central portion includes a coupling member configured to receive a removable light. In one embodiment, the first handle and the second handle includes textured grips.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Figure 1:
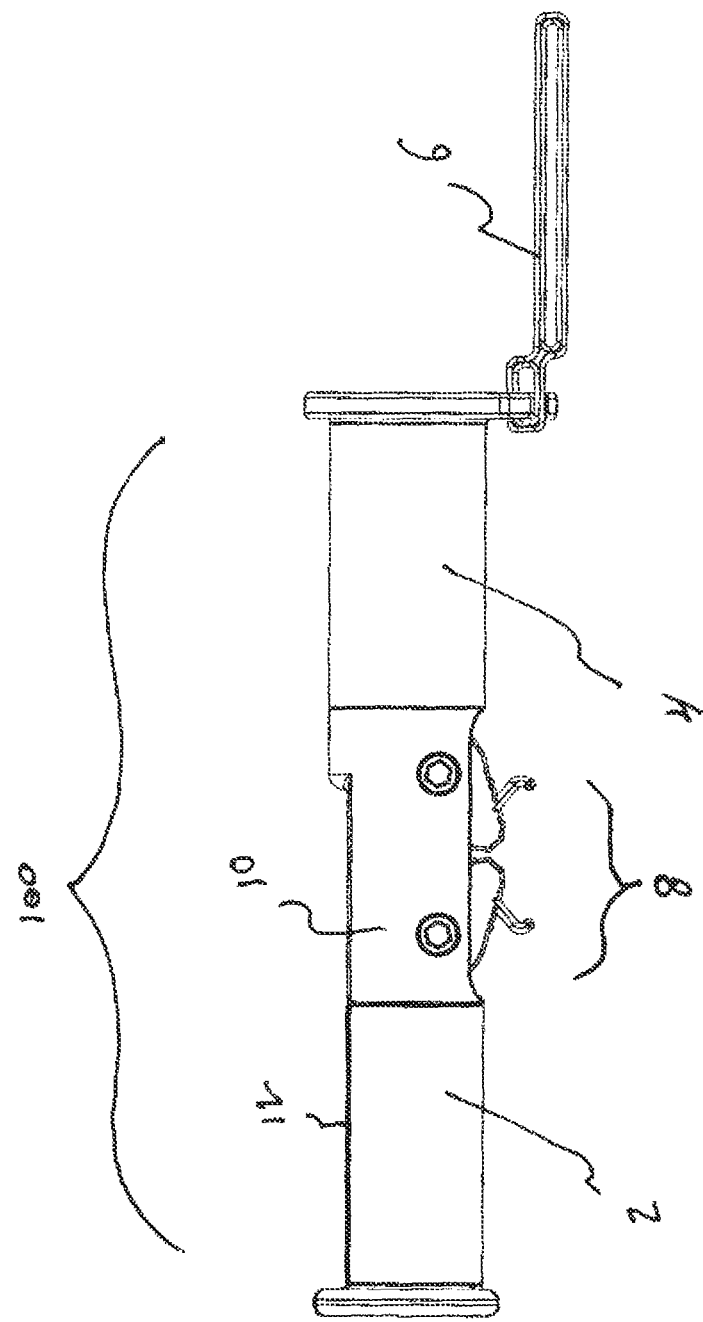
FIG. 1 is a side view of the invention.

Referring now to FIG. 1 we see a side view of the invention 100. A rigid tubular member is made up of a left side 2 a central portion 10 and a right side 4. The right side 4 is an open-ended tube that includes a slide out drawer for holding items such as bags or dog treats. The left side 2 includes a slot, as will be shown in additional Figures. The left 2 and right 4 sides are sized to be a proper grip for an adult user's hands. A wrist strap 6 is attached to the end of right end 4. Spring biased cleat assembly 8 allows the user to adjust the length of the leash, as will be shown in future Figures.

Figure 2:
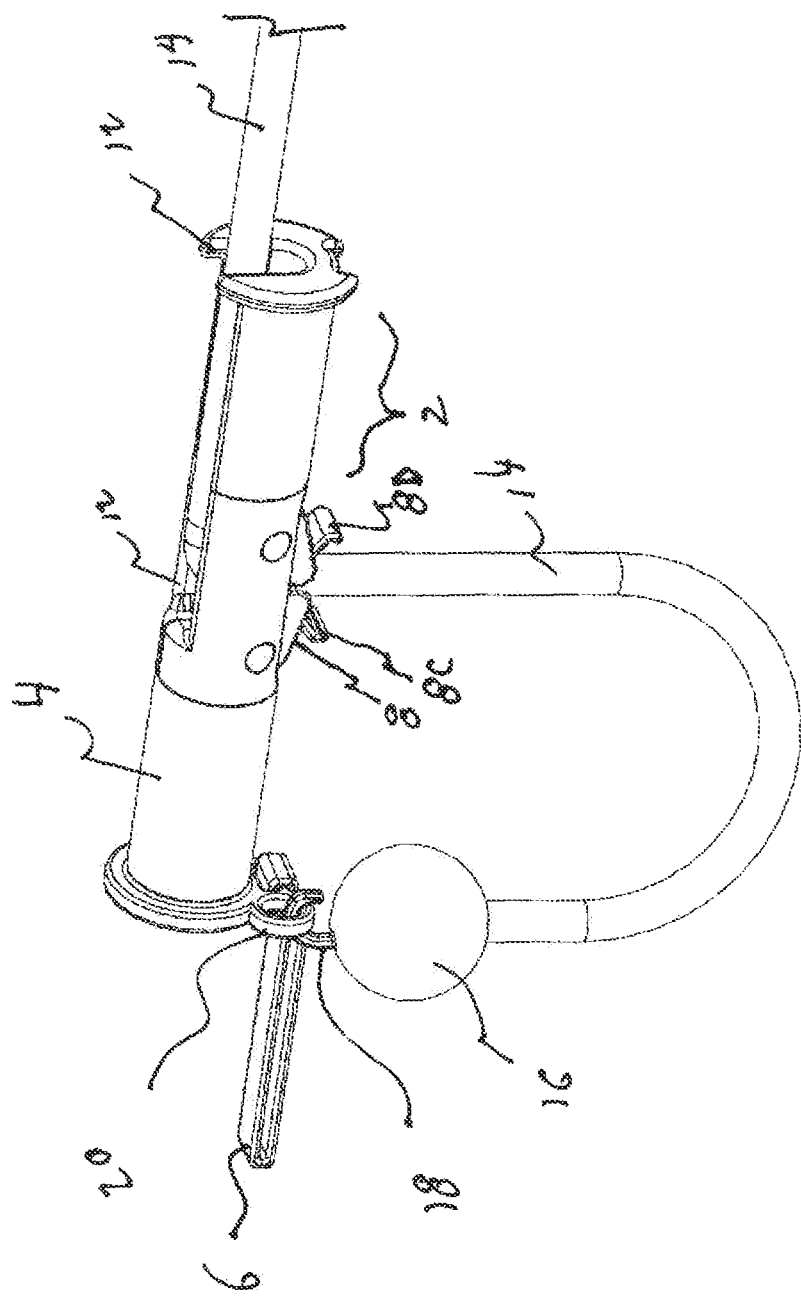
FIG. 2 is a perspective view of the invention with leash residing in slot.

FIG. 2 is a perspective view of the invention showing a dog leash 14 terminating at one end in a termination member 16 which is spherical in shape but may also be other shapes. The termination member 16 includes a hook member 18 that can attach to a loop member 20 located at the end of tube portion 4. The leash 14 in this embodiment is made of rope having a circular cross section. The rope passes through an aperture which is centrally located in the tubular handle 2, 4. The leash can bend ninety degrees to reside in slot 12 and exit the slot 12 to connect to a dog collar. This embodiment allows the user to hold the tube 4 with one hand when so desired. Cleat assembly 8 allows the leash 14 length to be adjusted by sliding the leash down to reduce the length of the usable portion of the leash, or to increase the length of the leash by pulling tabs 8C and 8D away from each other thereby freeing the leash 14 to be slid forward.

Figure 3:
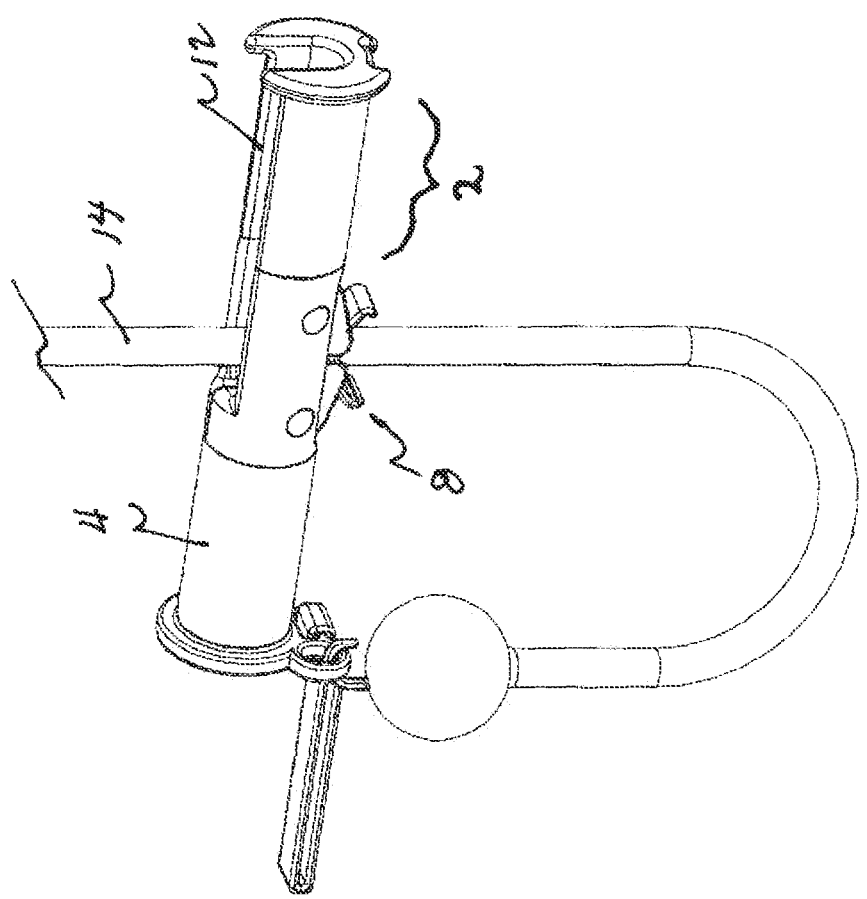
FIG. 3 is a perspective view of the invention with the leash exiting straight out of the tube aperture.

FIG. 3 is a perspective view that is similar to the view in FIG. 2 except that the leash 14 is extending straight out from the tube 2, 4 so that the leash 14 is perpendicular to the tube 2, 4. This allows the user to hold the tube 2, 4 with two hands when needing to restrain a large dog. The two-handed method of restraint increases the user's ability to control a dog that may be bolting after another dog or person. It also decreases the chance of injury to the user because the user is in a more stable position to restrain the dog when facing the dog directly and having both feet planted firmly on the ground while both hands grip the handles 2, 4.

Figure 4:
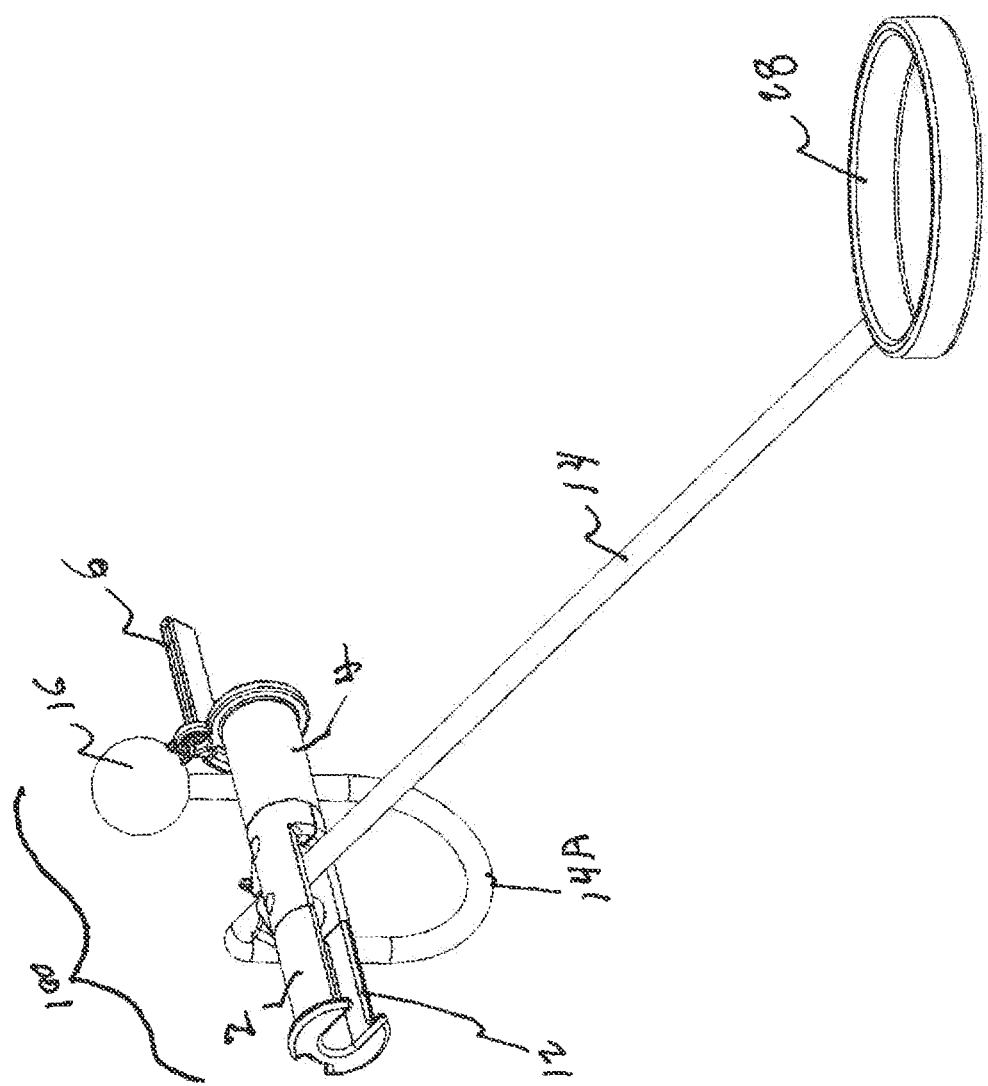
FIG. 4 is a perspective view of the leash being perpendicular to the handle.

FIG. 4 is a perspective view showing the invention used in the two-handed orientation. Leash 14 attaches to dog collar 28 in the standard way which involves a spring biased coupling, shown in FIG. 6. Leash termination member 16 insures that if the leash 14 is pulled to its maximum usable length, it will not fully escape the tubular handle 2, 4 because it is much larger than the aperture that the leash passes through. Excess leash 14A is prevented from dragging on the ground because termination member 16 is hooked to the end of tube portion 4.

Figure 5:
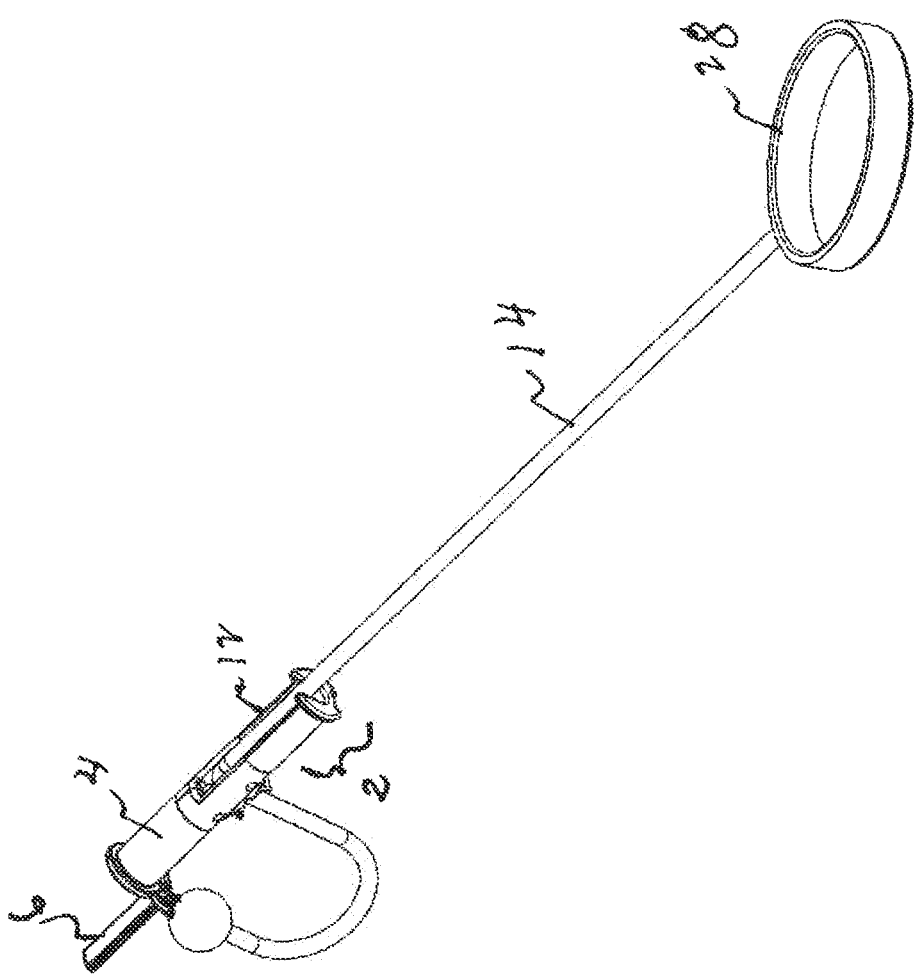
FIG. 5 is a perspective view of the leash being parallel to the handle.

FIG. 5 is a perspective view showing the invention being used in the one-handed orientation. Leash 14 is inserted into slot 12 and is extending straight out from tube portion 2. The user may prefer this one-handed operation when the dog is not expected to bolt. However, wrist strap 6 provides additional insurance that even if the dog bolts, the user will not lose total control of the handle 4.

Figure 6:
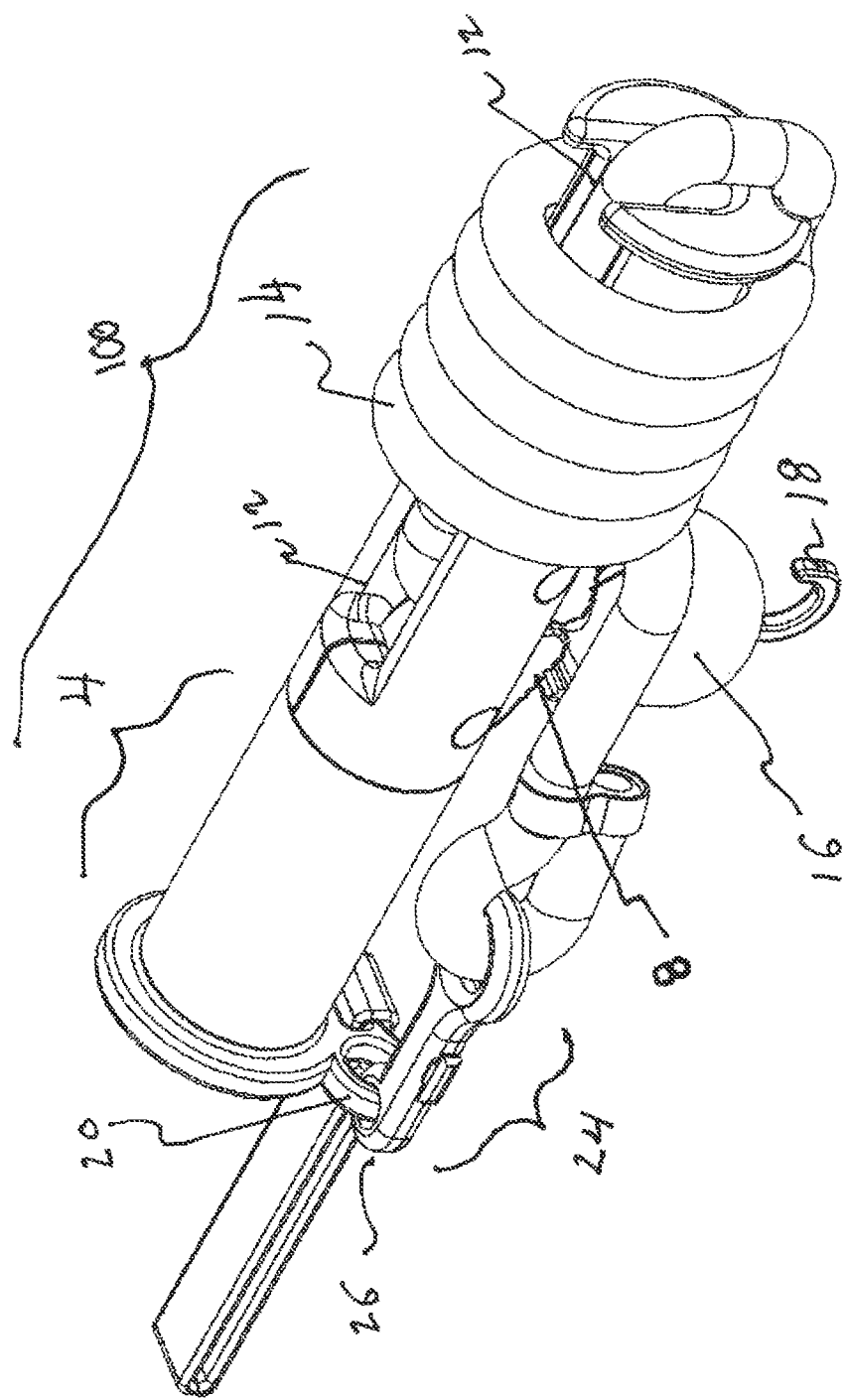
FIG. 6 is a perspective view of a rope type leash being rolled up on the handle for storage.

FIG. 6 is a perspective view of the invention 100 showing the leash 14 rolled up on the tubular structure 4, 2. The end of the leash terminates in a standard spring biased fastening clip 24 which is attached to a dog collar during use, but which is now attached to retaining ring 20 during storage mode. Terminating member 16 has been drawn up to be touching the cleat assembly 8.

Figure 7:
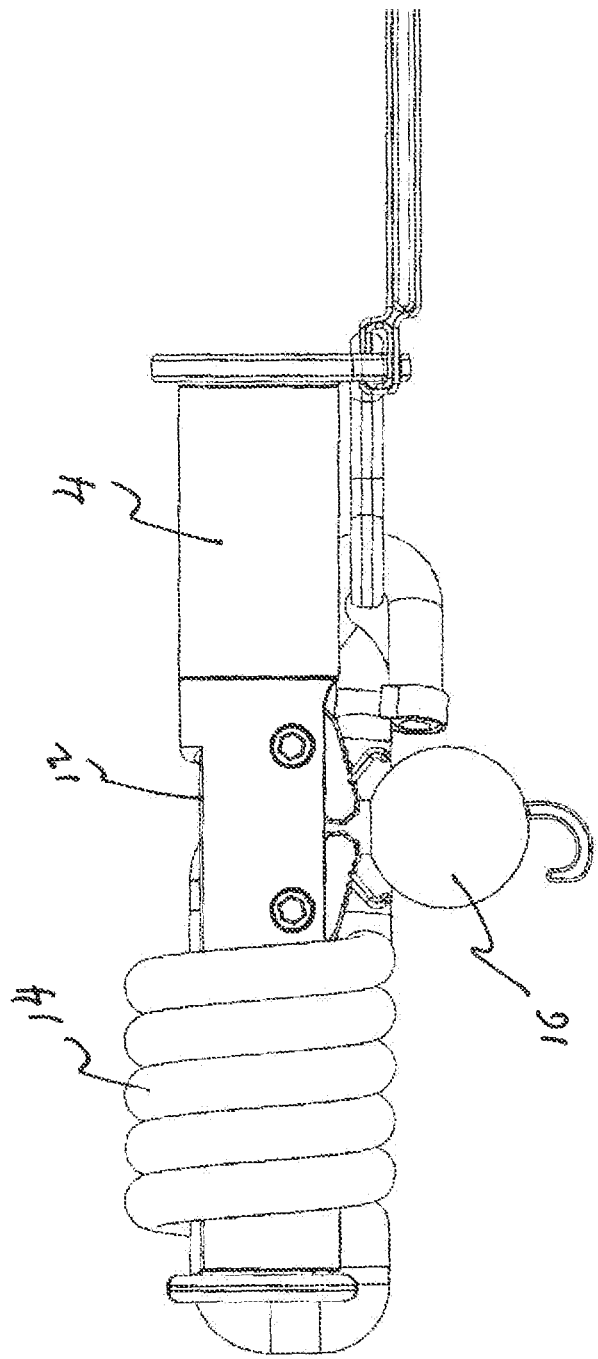
FIG. 7 is a side view of the rope type leash being rolled up on the handle.

FIG. 7 is a side view of the leash 14 in the storage position.

Figure 8:
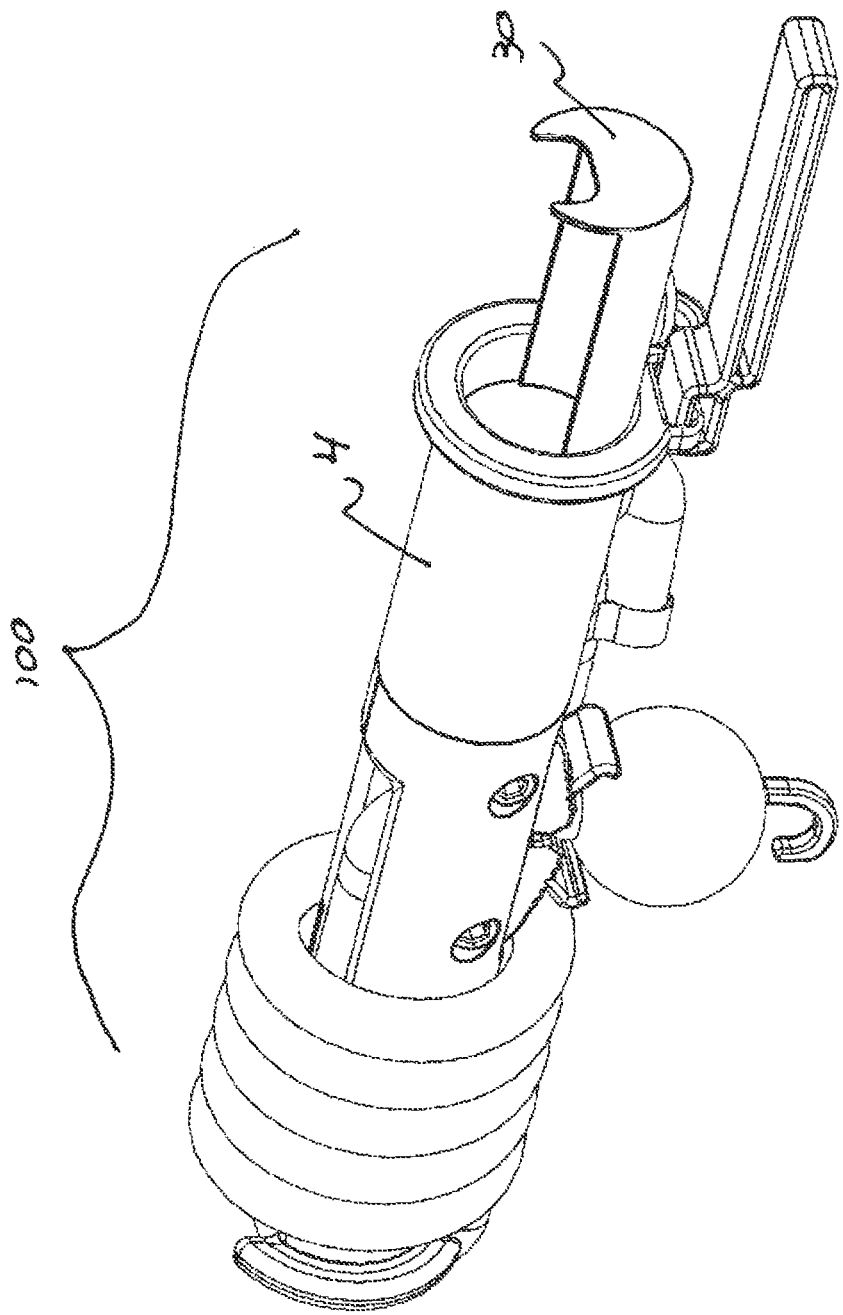
FIG. 8 is a perspective view of the storage compartment.

FIG. 8 is a perspective view showing the end of tubular portion 4 with the drawer 30 shown slid out and ready to accept a bag, or dog treat or other small item.

Figure 9:
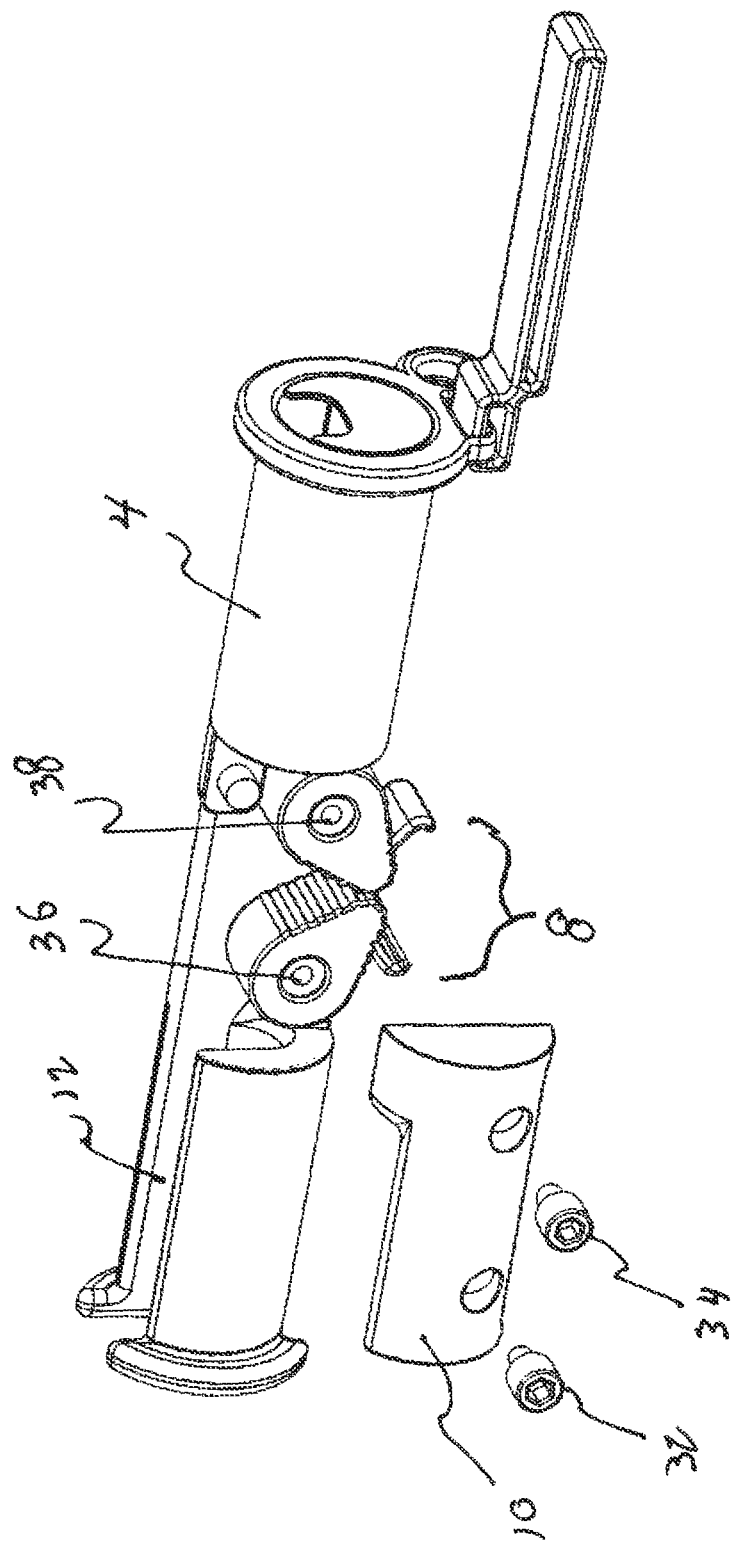
FIG. 9 is an exploded view showing the tube cover removed.

FIG. 9 is an exploded view showing the cleat cover 10 removed to fully expose the cleat assembly 8. The two cleat fingers are spring biased to be rotated inward toward each other and pivot on posts 36, 38. The posts 36, 38 are recessed so that screws 32, 34 can be screwed into the recessed area that remains after the screw heads 36, 38 have been fully secured, thereby holding cover plate 10 in place.

Figure 10:
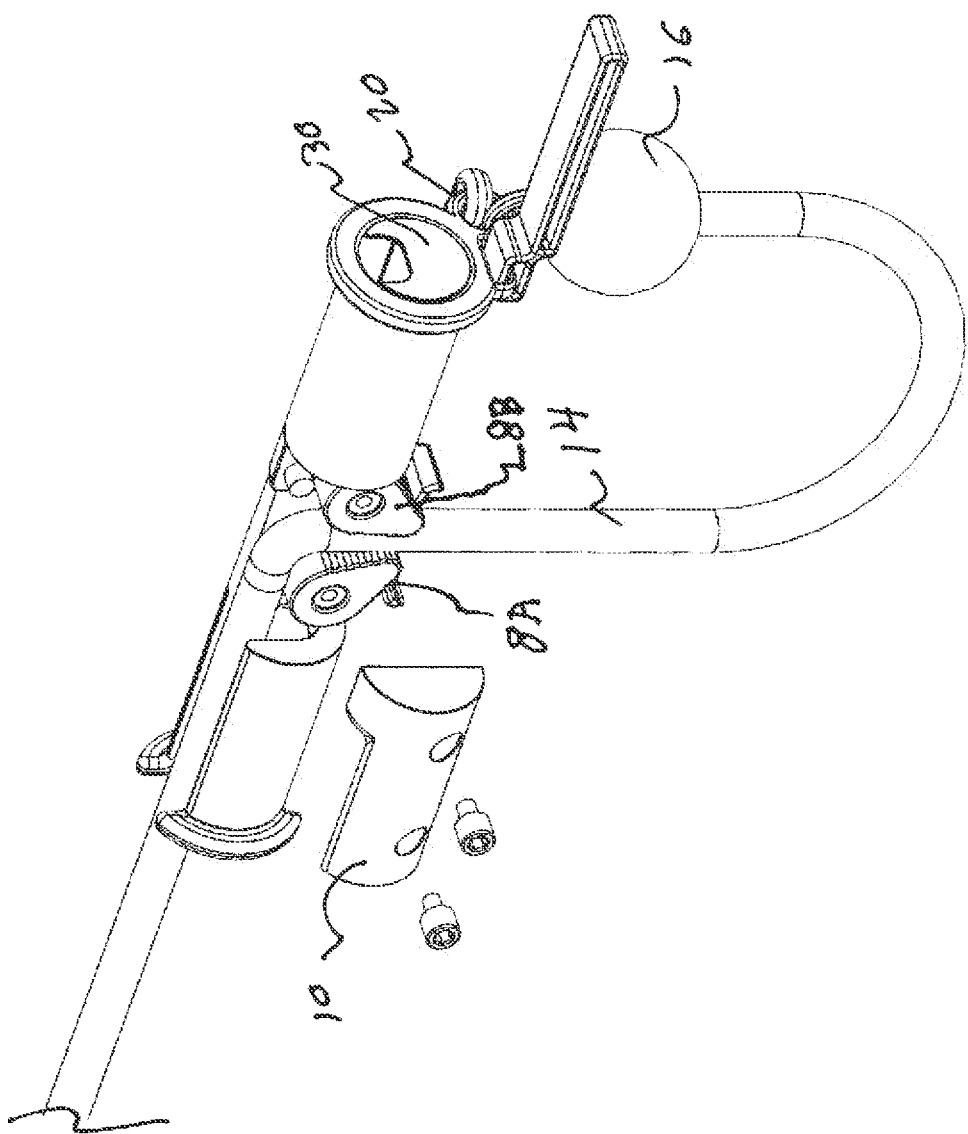
FIG. 10 is an exploded view with the tube cover removed and the rope type leash in place.

FIG. 10 is a perspective view similar to that of FIG. 9 but with leash 14 in place. Cleat fingers 8A, 8B have been spread to accommodate the diameter of the leash rope 14. The teeth on each cleat finger 8A, 8B prevent the rope from being pulled up. The cleat assembly 8 is rated for approximately three hundred pounds of pull force.

Figure 11:
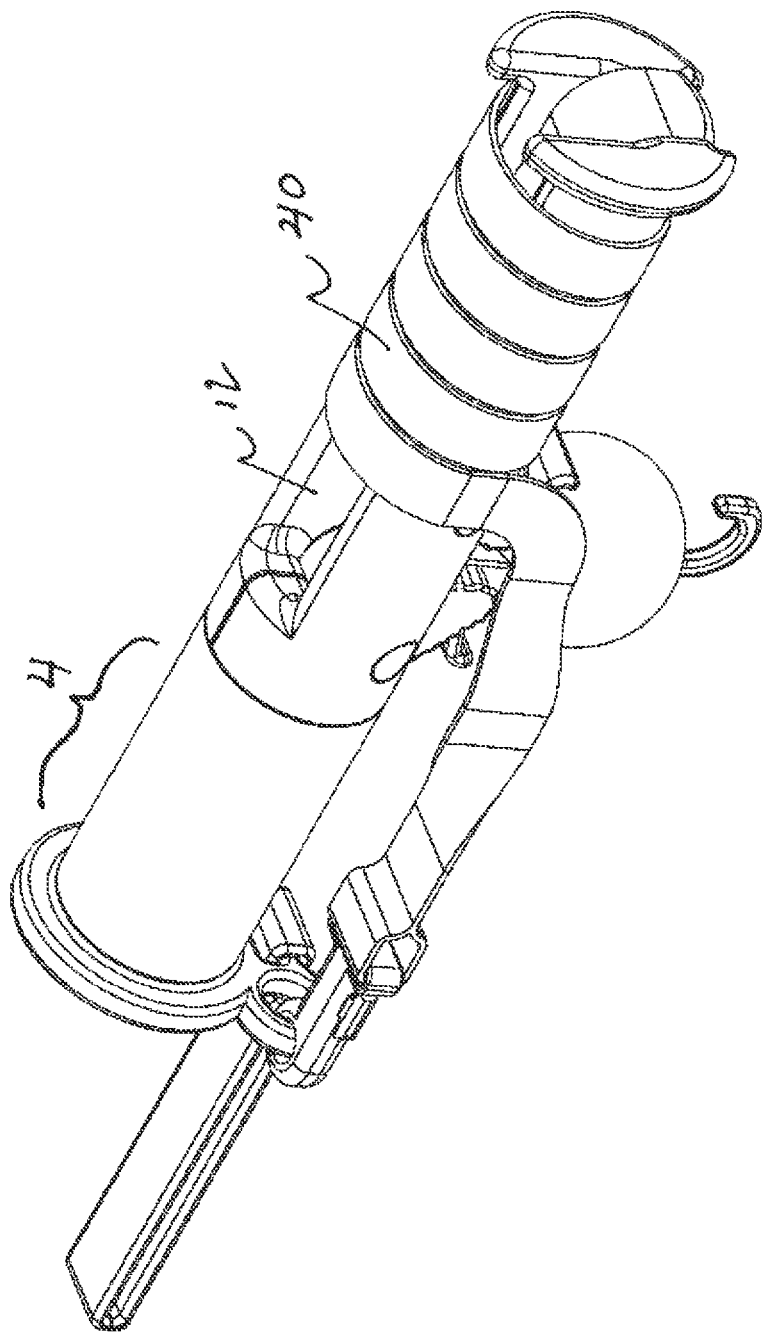
FIG. 11 is a perspective view of a flat leash rolled up onto the tubular handle.

FIG. 11 is a perspective view of the invention with a flat type leash 40 rather than a round rope type leash 14. The cleat assembly 8 works equally as well with a flat leash 40 or a rope type leash 14.

Figure 12:
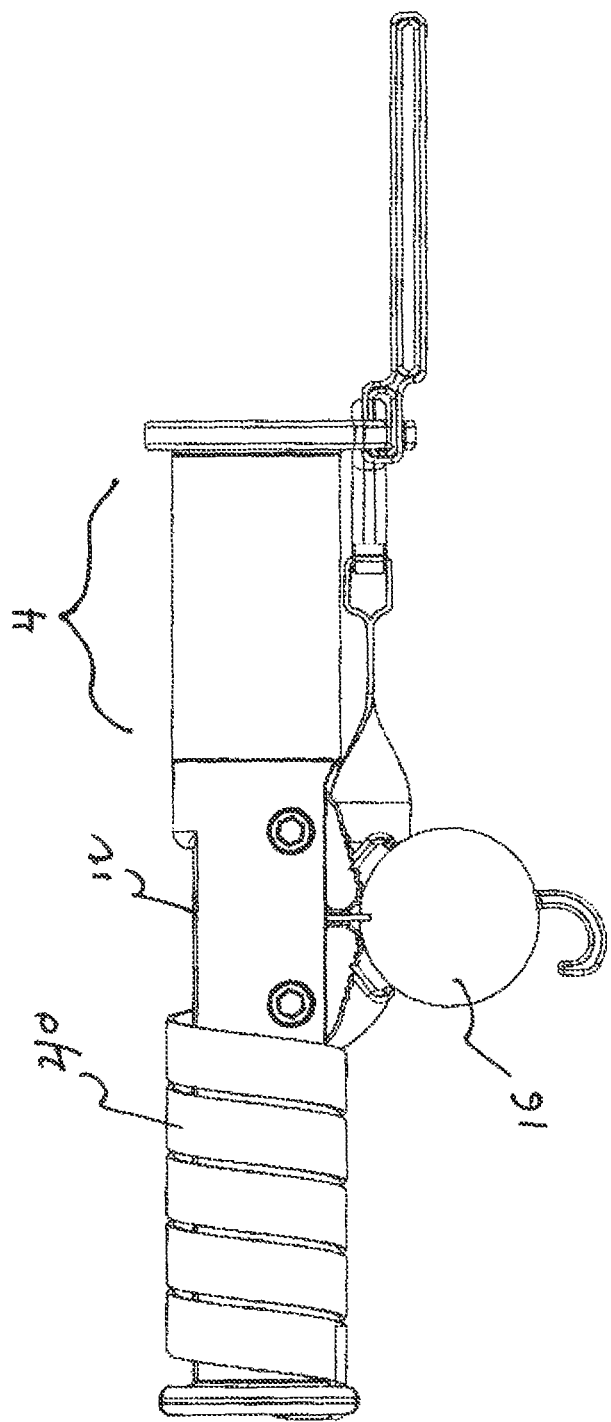
FIG. 12 is a side view of the flat leash rolled up onto the tubular handle.

FIG. 12 is a side view of the invention with a flat type leash 40 wrapped into the storage position.

Figure 13:
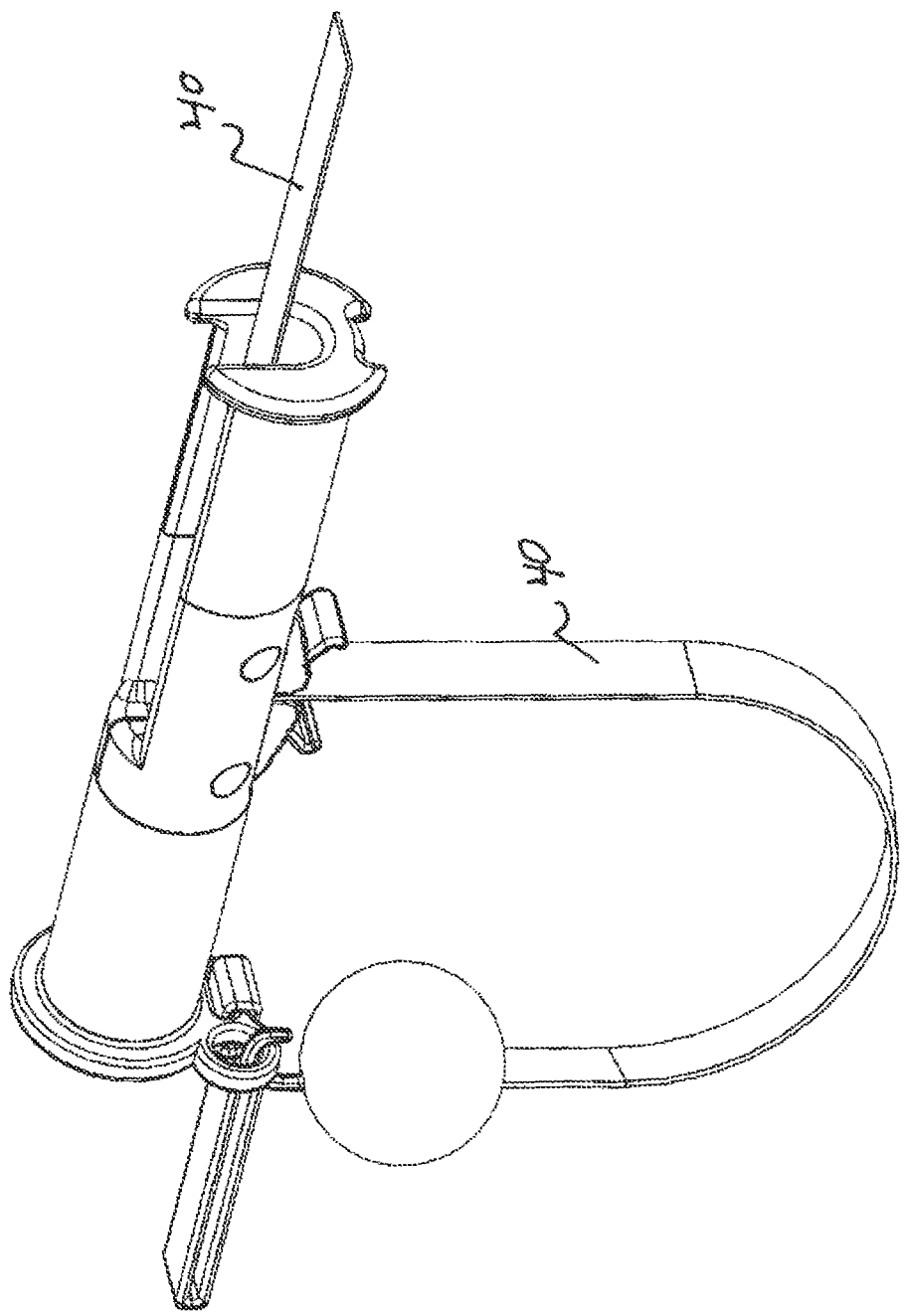
FIG. 13 is a perspective view of the flat leash being used in the one-handed condition.

FIG. 13 is a perspective view of the invention 100 with the flat leash 40 in the one-handed orientation.

Figure 14:
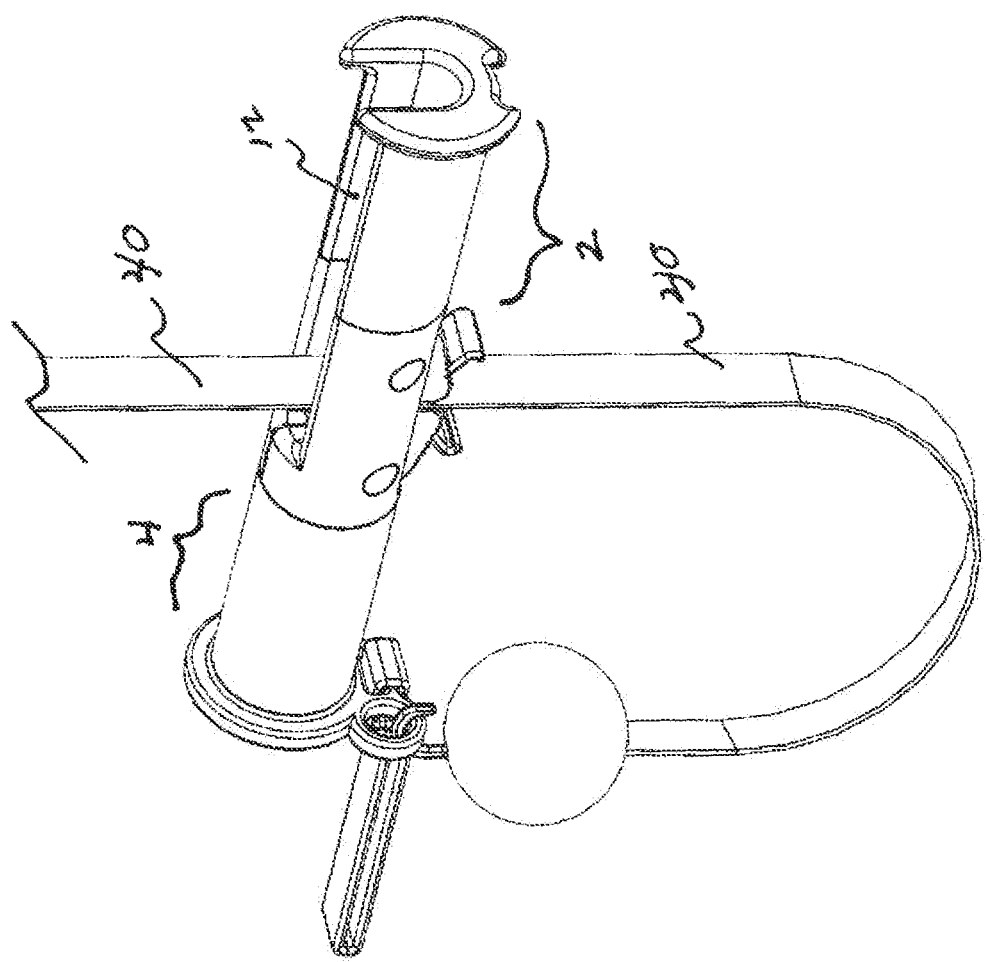
FIG. 14 is a perspective view of the flat leash being used in the two-handed condition.

FIG. 14 is a perspective view of the invention 100 with the flat leash 40 in the two-handed orientation.

Figure 15:
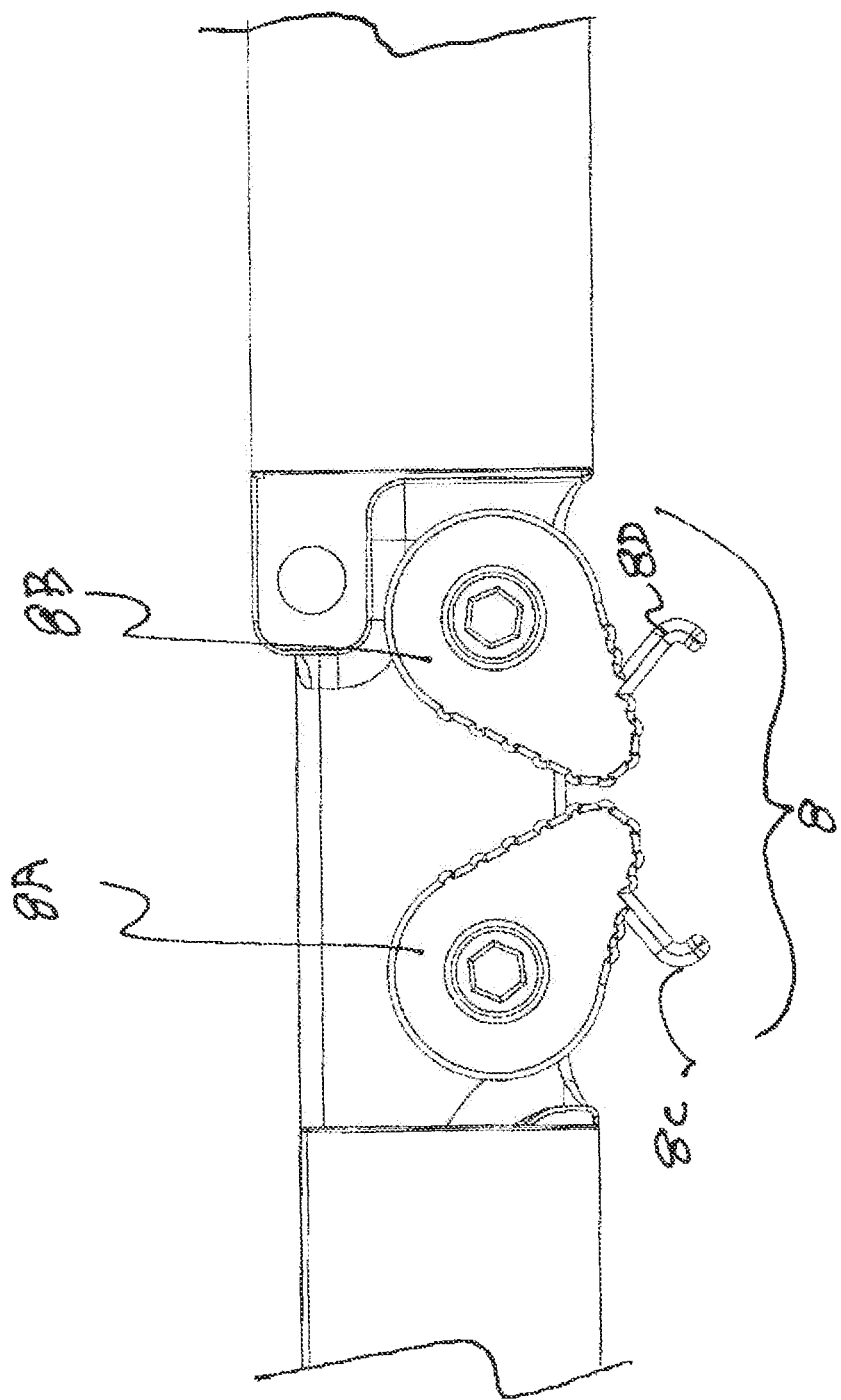
FIG. 15 is a close-up view of the cleat assembly in the closed position.

FIG. 15 is a close-up view of the cleat assembly 8 clearly showing cleat fingers 8A and 8B as well as spreading tabs 8C and 8D.

Figure 16:
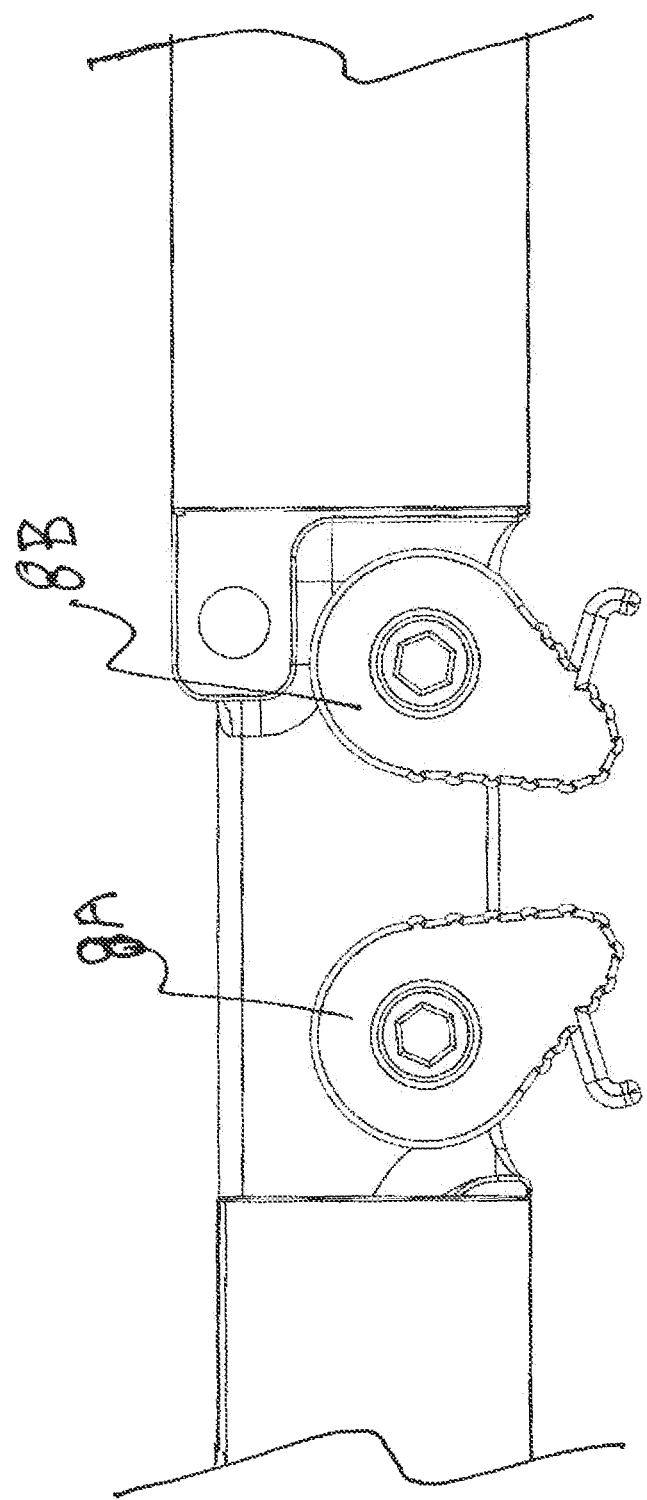
FIG. 16 is a close-up view of the cleat assembly in the open position.

FIG. 16 is the same as FIG. 15 except that the cleat fingers 8A and 8B are spread and ready to accept rope leash 14.

Figure 17:
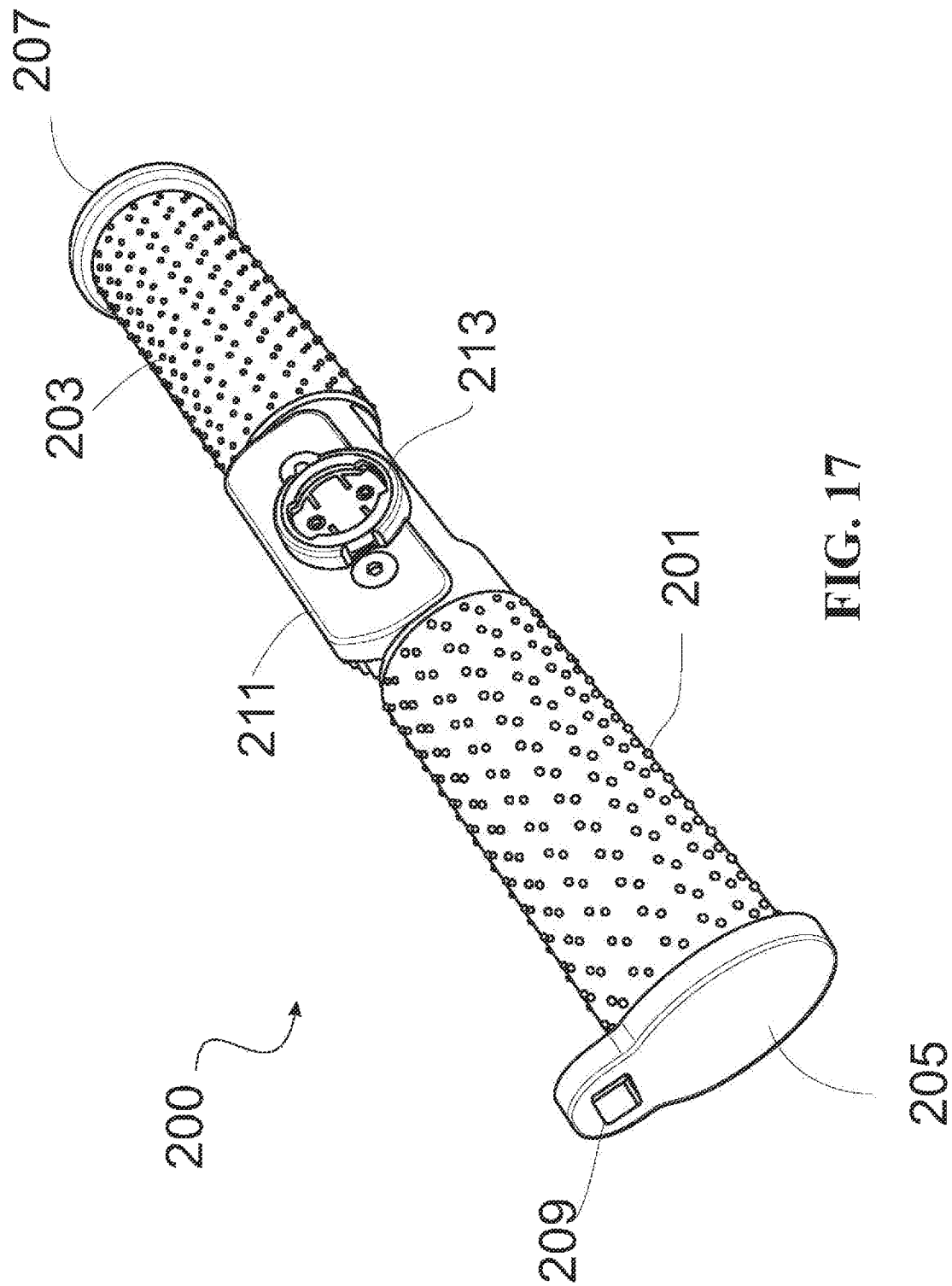
FIG. 17 is a bottom perspective view of an alternative embodiment of the invention.
Figure 18:
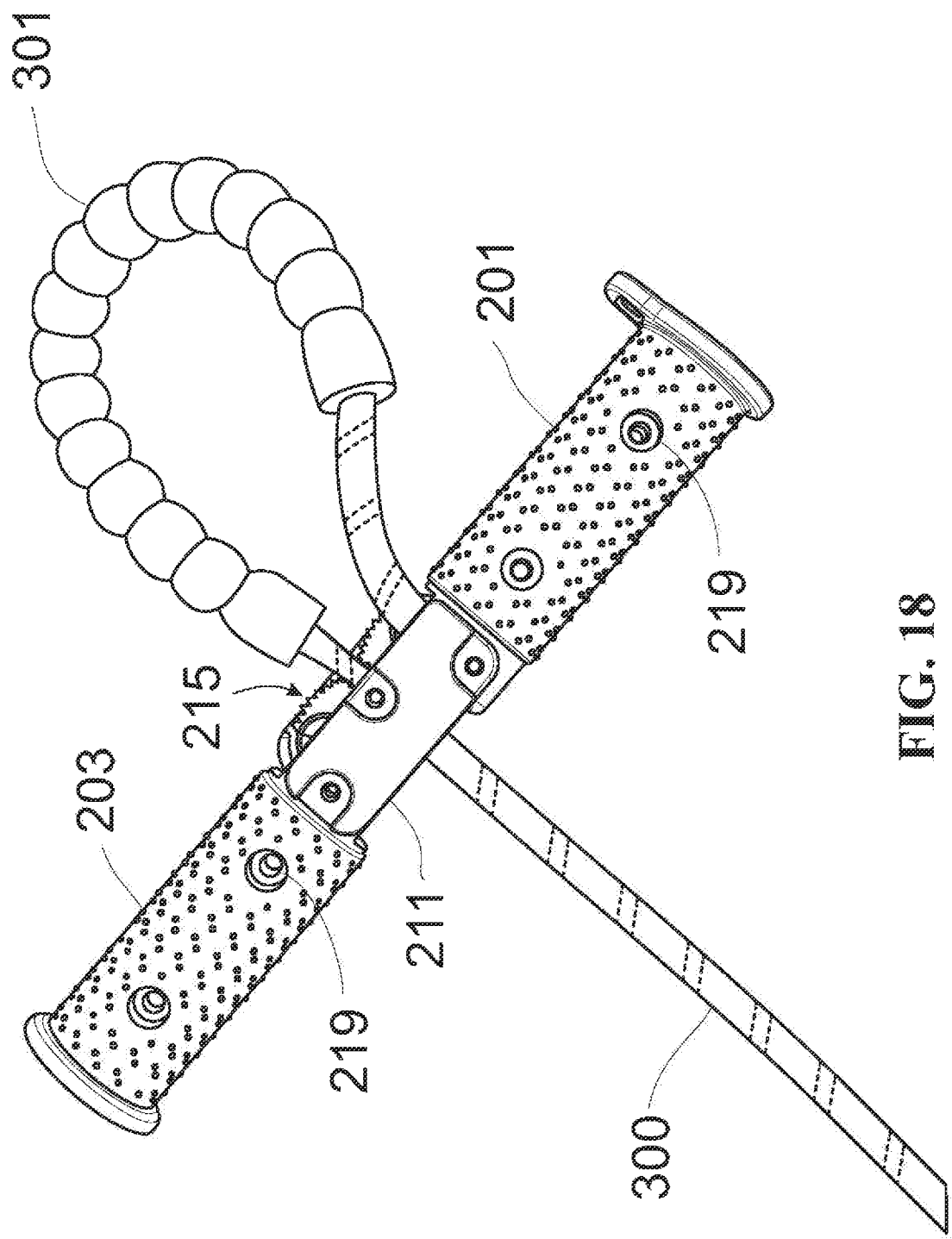
FIG. 18 is a top perspective view of the alternative embodiment of the invention with a rope type leash installed.
Figure 19:
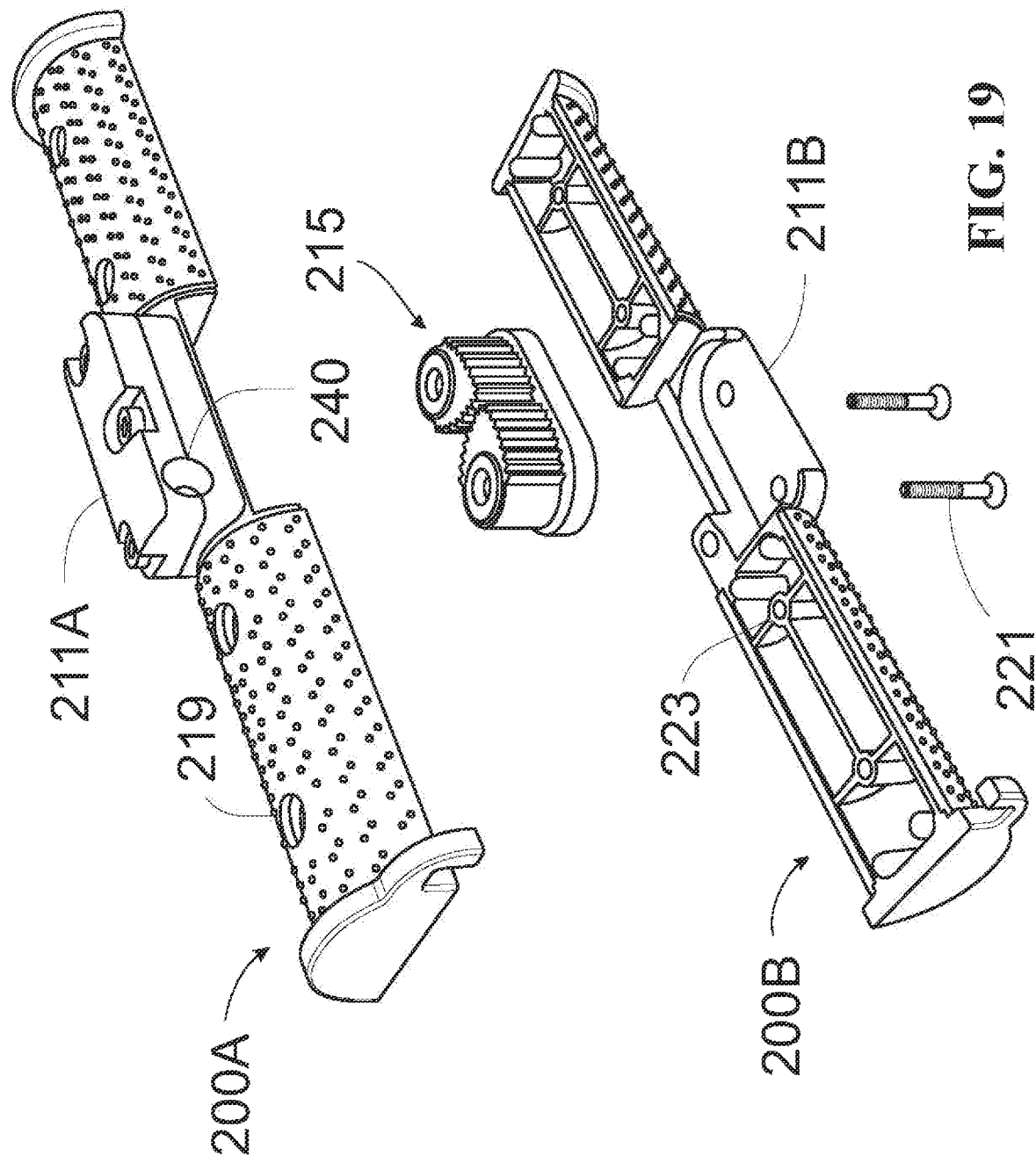
FIG. 19 is an exploded view of the alternative embodiment of the invention.

FIGS. 17-19 illustrate various views of an alternative embodiment of the invention. Referring now to FIGS. 17-19, the alternative embodiment of a two handed dog leash 200 is illustrated. In one embodiment, the two handed dog leash 200 is constructed from a top portion 200A and lower portion 200B forming a rigid tubular member. In one embodiment, the rigid tubular member includes a first handle 201, a second handle 203, and central portion 211, wherein the central portion is positioned between the first and second handles. In some embodiments, grip or texture may be provided on the handles to assist in a user griping the handles of the invention during use. In one embodiment, end caps 205 and 207 terminate each end of the rigid tubular member on the distal end of each handle. In some embodiments, the end caps are integrally formed with the rigid tubular member. In other embodiments, the end caps are separate members that are installed over the distal ends of the handles. In this case, one or both caps may be removed to provide storage within the rigid tubular member. In yet other embodiments, an extendable drawer may be provided within a slot in the rigid tubular member, wherein the extendable drawer is configured to extend out of a distal end of a handle providing storage for items. In some embodiments, the caps are fixed and no storage compartments are provided. In one embodiment, an opening or ring 209 is provided on end cap 205 providing the installation of a wrist strap, a keychain, a waste bag container, or similar item. The wrist strap secures the invention to a user's wrist as well known in the art.

In some embodiments, a coupling member 213 is provided on the underside of the central portion 211, wherein the coupling member is configured to receive an accessory member (not shown). In one embodiment, the accessory member is a removable light, such as a flashlight. In other embodiments, accessory member may be anything known in the art, including but not limited to, a cell phone holder, dog spray, a container, or a generic attachment member, such as hooks to hold waste bags, a wallet, dog treats, etc.

Advantageously, cleat assembly 215 is entirely positioned within the central portion 211 of the rigid tubular member. The cleat assembly functions as described in the previous embodiment, and enables a user the ability to adjust the length of an installed leash through the central aperture formed within the central portion. This will be described in further details below.

As previously mentioned, in some embodiments, a top portion 200A and lower portion 200B form the rigid tubular member. In this embodiment, a plurality of mounting holes 219 may be provided in the top portion or bottom portion of the handles configured to align with mounting holes 223 within the inner structure of the rigid tubular member. Likewise, mounting holes may be provided on the top 211A and bottom 211B portions of the central portion. Mounting screws 221 may be used to secure the top and bottom portions of rigid tubular member together. Although, not intended to be separated by the user, removal of the mounting screws provides the ability to access the cleat assembly 215 and terminating member 240 if necessary, as well as the ability to replace leash 300 if desired.

Figure 20:
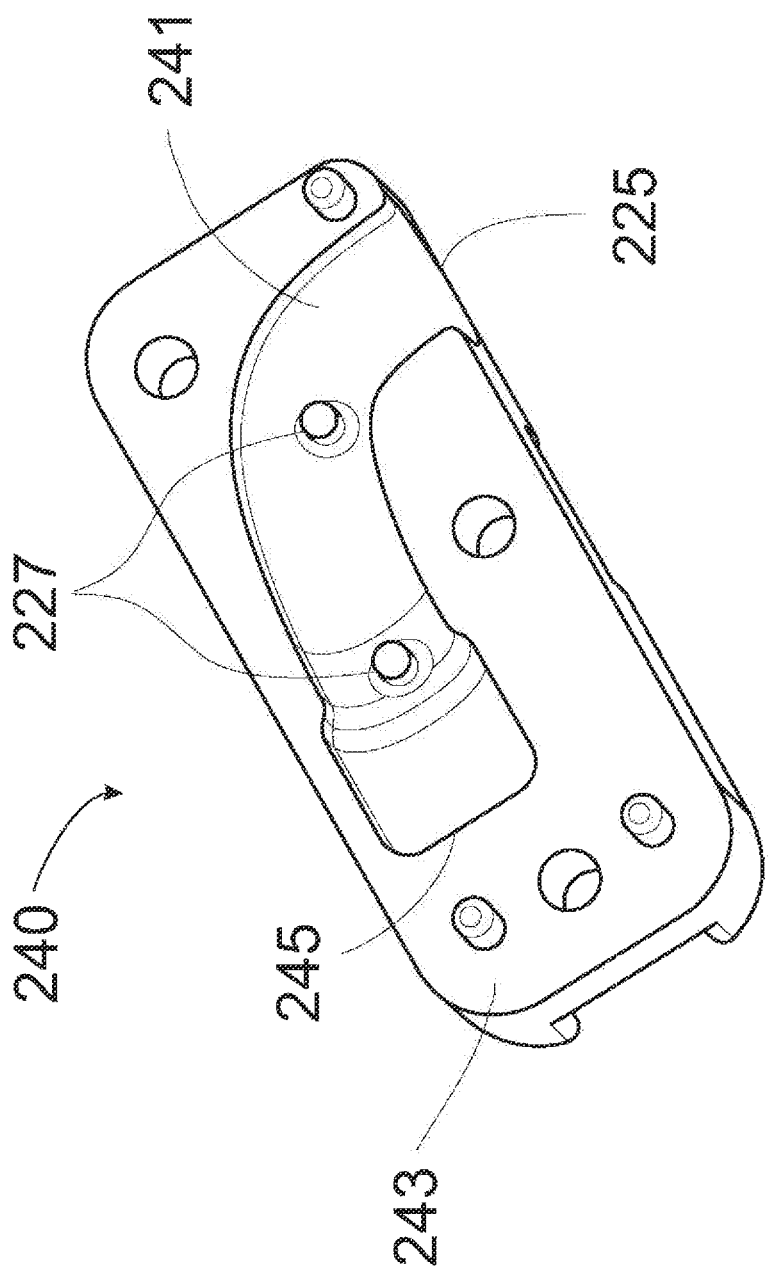
FIG. 20 is a top inner portion of the central portion showing the terminating member for leash retention according to an embodiment of the present invention.

Referring now to FIG. 20, a top portion of the terminating member 240 is shown. In one embodiment, the top portion 211A of the central portion is the terminating member 240. In one embodiment, the terminating member 204 includes curved passageway 241 within the body or solid material 243 of the terminating member. The curved passageway has an opened end 225 terminating at a closed end 245. In some embodiments, throughout the length of the curved passageway a number of spiked prongs 227 are provided. Although two spiked prongs are illustrated, any number of spiked prongs may be provided. The bottom portion of the terminating member (not illustrated in this view) is structured similar, such that the end of a leash 300 (best seen in FIG. 18) is configured to be secured within the curved passageway 241 of the terminating member 240 via the spiked prongs 227. The leash 300 is pressed between the two portions of the terminating member and held via the spiked prongs. Consequently, the leash 300 is configured to be provided with the invention and is not intended to be removed, unless for replacement as described above.

Referring now to FIG. 18, during use, a user may hold one or both handles 201 and 203 while walking a dog (not illustrated) coupled to the end of leash 300 via a harness or collar as well known in the art. Advantageously, the extension or retraction of the leash via the cleat assembly enables the user the ability to dial in the preferred leash length during use. To reduce the length of the leash 300, the user may pull the leash through the central portion 211, and more specifically, the central aperture formed within the central portion, wherein the cleat assembly 215 enables the leash 300 to be secured to a desired length. In some embodiments, a cushioned loop 301 is provided around a portion of the leash 300 providing easy gripping of the leash when adjusting the length, or provides an option for holding the invention during use (loose leash walking). To extend the length, the user opens the spring-loaded cleats in the cleat assembly 215 allowing the slack of the leash to extend through the central aperture. In one embodiment, the cushioned loop 301 is provided between the terminating member and the cleat assembly.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A two-handed dog leash comprising:
    a rigid tubular member having a first handle, a second handle, and central portion, wherein the central portion is positioned between the first and second handles and defines a centrally located aperture;
    a cleat assembly positioned within the centrally located aperture;
    a leash terminating member;
    a flexible dog leash having a first end and a second end, the first end terminating at the leash terminating member and the second end passing through the cleat assembly within the centrally located aperture; and,
    the flexible dog leash capable of extending and retracting through the cleat assembly such that a length between the second end and rigid tubular member is adjustable.

2. The two handed dog leash as claimed in claim 1, wherein the leash terminating member is entirely positioned within the rigid tubular member.

3. The two handed dog leash as claimed in claim 1, wherein the cleat assembly includes a pair of spring biased inwardly facing cleat members rotatably pinned to the rigid tubular member.

4. The two handed dog leash as claimed in claim 1, wherein the flexible dog leash is constructed of rope having a circular cross section.

5. The two handed dog leash as claimed in claim 4, wherein the flexible dog leash includes a cushioned loop surrounding a portion of the flexible dog leash between the cleat assembly and the leash terminating member.

6. The two handed dog leash as claimed in claim 1, wherein the rigid tubular member includes end caps, and the first and second handles each have a distal end at which the end caps are located.

7. The two handed dog leash as claimed in claim 6, wherein at least one of the end caps include a loop configured to receive a wrist strap.

8. The two handed dog leash as claimed in claim 1, wherein the leash terminating member is formed within the central portion.

9. The two handed dog leash as claimed in claim 1, wherein the leash terminating member includes a curved passageway having an opened end and closed end with a number of spiked prongs throughout the curved passageway, wherein the spiked prongs are configured to retain the first end of the flexible leash.

10. The two handed dog leash as claimed in claim 1, wherein the central portion includes a coupling member configured to receive a removable light.

11. The two handed dog leash as claimed in claim 1, wherein the first handle and the second handle include textured grips.

* * * * *